(12) United States Patent　　(10) Patent No.: US 7,837,524 B2
　　Tesvich　　　　　　　　　　　　　　(45) Date of Patent: Nov. 23, 2010

(54) UNDERWATER PROPULSION APPARATUS PERFORMANCE ENHANCEMENT DEVICE AND ASSOCIATED METHODS

(76) Inventor: John A. Tesvich, 30300 Highway 23, Buras, LA (US) 70041

( * ) Notice: Subject to any disclaimer, the term of this patent is extended or adjusted under 35 U.S.C. 154(b) by 333 days.

(21) Appl. No.: 12/196,469

(22) Filed: Aug. 22, 2008

(65) Prior Publication Data

US 2009/0053945 A1　　Feb. 26, 2009

Related U.S. Application Data

(60) Provisional application No. 60/957,206, filed on Aug. 22, 2007.

(51) Int. Cl.
　　*B63H 23/34*　　(2006.01)
(52) U.S. Cl. .......................... 440/83; 384/97
(58) Field of Classification Search ............... 440/83, 440/112; 416/93 A, 93 R, 120, 124, 174, 416/244 R, 247 A, 248; 384/97, 98
See application file for complete search history.

(56) References Cited

U.S. PATENT DOCUMENTS

| 3,177,841 | A | 4/1965 | Galuska |
| 3,407,779 | A | 10/1968 | Satterthwaite et al. |
| 4,447,214 | A | 5/1984 | Henrich |
| 4,507,091 | A | 3/1985 | Govan |
| 4,801,281 | A | 1/1989 | Govan |
| 4,861,294 | A | 8/1989 | Ousley, II |
| 4,943,249 | A | 7/1990 | Govan |
| 5,143,455 | A * | 9/1992 | Squyres ........................ 384/97 |
| 5,209,684 | A * | 5/1993 | Mondek et al. ................ 440/83 |
| 5,292,270 | A | 3/1994 | Tucker et al. |
| 5,472,359 | A | 12/1995 | Allbright, Jr. et al. |
| 5,582,528 | A | 12/1996 | Rafferty et al. |
| 5,860,745 | A * | 1/1999 | Squyres ........................ 384/97 |
| 6,113,445 | A | 9/2000 | Trosclair |
| 6,767,461 | B1 | 7/2004 | Caulfield |
| 7,134,837 | B2 | 11/2006 | Shaw |

* cited by examiner

*Primary Examiner*—Lars A Olson
(74) *Attorney, Agent, or Firm*—Jacqueline E. Hartt; Lowndes, Drosdick, Doster, Kantor & Reed, P.A.

(57) ABSTRACT

A device that when fitted to a motor vessel's existing propulsion gear improves the performance and reduces potential damage and wear of underwater propeller shaft bearings, commonly referred to as "cutlass bearings" that are used on boats, ships, etc. Designed with radially mounted impeller blades around the periphery of the propeller shaft, the device creates a forced flow of water by centrifugal pumping action, which creates suction along the shaft abaft the cutlass bearing, thereby increasing the flow of water through the cutlass bearing. The device also greatly diminishes the probability that fouling around a propeller shaft will severely restrict water flow through the cutlass bearing.

21 Claims, 5 Drawing Sheets

UNDERWATER PROPULSION APPARATUS PERFORMANCE ENHANCEMENT DEVICE AND ASSOCIATED METHODS

CROSS-REFERENCE TO RELATED APPLICATION

This application claims priority to provisional application Ser. No. 60/957,206, filed Aug. 22, 2007.

BACKGROUND OF THE INVENTION

1. Field of the Invention

The present invention relates to devices and methods for marine propulsion and liquid pumping, and, more particularly, to such devices and methods for improving a performance of marine propulsion and pumping systems.

2. Description of Related Art

A cutlass bearing (common usage) is a special type of bearing used extensively in marine and industrial applications for bearings operating underwater or in other liquids. Cutlass bearings have no moving parts, and the bearing material is usually composed of a type of synthetic rubber and/or polymer, which supports the propeller shaft. Cutlass bearings are designed to utilize the lubricating properties of a hydraulic film of the surrounding water/fluid in which the bearing is operating. For this reason channels are designed within the bearing surface to promote the flow of liquids through the bearing, assuring proper lubrication while cooling the bearing and shaft surfaces at the same time.

A common problem in propeller-driven vessels is fouling of the propeller and shaft with lines, rope, netting, plastic bags, etc. When propeller shafts are fouled, often the fouling material is wound around the shaft in the section between the cutlass bearing and propeller hub. When this happens, the flow of water through the cutlass bearing is restricted and, in some cases, is cut off entirely. A vessel operator is sometimes made aware of a fouling condition because of vibration in the propulsion gear and diminished performance. If he is aware of the fouling, the operator will usually attempt to clear it by reversing the propulsion gear in an attempt to release the wound-up fouling, or, when that is not successful, someone may go overboard to clear the fouled propulsion gear. Even a small amount of fouling right next to the cutlass bearing will severely impede the flow of lubricating water because the cross-sectional area of the water channels in the bearing is relatively small. Small amounts of fouling around a propeller shaft, however, often goes unnoticed for extended periods. In this situation, the cutlass bearing suffers premature wear because of starvation of lubricating water. Furthermore, it is fairly common to have the aft ends of bearings and bearing housings physically damaged and abraded when fouling materials are tightly wrapped around the propeller shaft for an extended period.

Several devices have been designed and marketed for the purpose of preventing propeller and shaft fouling. They are generally based on rotary cutters that are attached to the shaft and act to cut the fouling materials as they begin to wrap around the shaft. Although some of these devices work well under the ideal conditions for which they were designed, they are not as effective in extreme conditions. These cutting devices generally require frequent repair and replacement in heavy use applications such as those experienced by vessels operating in the commercial sector. These devices also are not specifically designed to increase the flow of water through the cutlass bearing.

Therefore, it would be beneficial to provide a simple, robust, and dependable device and method of manufacture and use for substantially preventing fouling of propellers, shafts, and cutlass bearings in marine vehicles.

SUMMARY OF THE INVENTION

The present invention is directed to a device that is mountable on a propeller shaft abaft (in back of) a cutlass bearing for improving a performance of a propeller-driven propulsion apparatus. The device comprises an annular collar affixable for rotation with and dimensioned for positioning about a shaft of a propeller in a longitudinal space between a propeller hub and a cutlass bearing. A plurality of impeller blades are affixed to and extend radially out from the collar in spaced-apart relation. Each impeller blade has a length sufficient to nearly span the longitudinal space between the propeller hub and the cutlass bearing, leaving a gap between forward ends of the blades and the cutlass bearing.

An annular ring is affixed in spanning relation to the forward ends of the impeller blades. A bridging element extends from one of the annular ring and the cutlass bearing, and is positioned to longitudinally bridge the gap between the blades forward ends and the cutlass bearing, thereby substantially enclosing the gap.

In use, the impeller blades rotate in conjunction with the propeller shaft, and in doing so they create a centrifugal flow of water outward from the shaft, which in turn creates suction along the shaft surface and abaft the cutlass bearing. The suction draws water through the water channels in the bearing surface. The pumping action of the impeller blades, along with the greatly increased discharge area for water around the periphery of the device, greatly decreases the likelihood that fouling around the propeller shaft can restrict the flow through the cutlass bearing. Additionally, the outside edges of the impeller blades help cut through and shear away the rotating fouling materials over time, making it much more likely that the fouling material eventually be cut and thrown off than it would when wound up on a relatively smooth shaft surface.

The device can be easily attached to the existing propulsion gear of a vessel in order to improve the dependability and performance, and reduce the maintenance cost, of the propulsion gear. The invention can relate to that sector of vessels that utilize a propulsion system composed of an inboard engine that turns a drive shaft exiting through the hull to turn a propeller. This type of propulsion apparatus normally uses one or more cutlass bearings to support the shaft in its underwater section.

The device of the present invention increases water flow through normal cutlass bearings and decreases the likelihood that the waterflow be severely impeded by propeller and shaft fouling. The device, even with fouling around the propeller shaft, lessens the likelihood of bearing damage owing to lack of water circulation. In order to achieve this, the device has multiple radially mounted blades that extend from the shaft surface outward. These blades act as an impeller to create centrifugal pumping action in the water when the shaft is rotated. The periphery of the device also creates a large area for fluid discharge, which makes severely flow restriction by fouling less likely.

The present device, when mounted abaft a cutlass bearing, shield the bearing from physical damage and erosion from fouling materials that may become wrapped around the propeller shaft. The blades of the device mounted immediately abaft the bearing prevent fouling materials from reaching the after end of the bearing and bearing housing, thereby protecting the bearing and housing from direct abrasion.

The present device is robust and durable, and is able to remain effective under extreme conditions and extended use. The device can be constructed of, for example, stainless steel or other corrosion-resistant metal alloys with welded or cast components and does not depend on sharp edges or close tolerances to remain effective.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

BRIEF DESCRIPTION OF THE DRAWINGS

FIG. 5A, a flat plate blade of rectangular cross section with square outside edge; FIG. 5B, a flat blade design with pointed ends; FIG. 5C, a flat blade design with serrated edge; FIG. 5D, a curved blade.

FIG. 6A, a blade placed with its radial axis collinear with a radial axis of the shaft; FIG. 6B, an impeller blade with a radial axis at an angle with respect to the shaft radial axis.

FIG. 7A, the longitudinal axis of the impeller blades parallel with the shaft longitudinal axis; FIG. 7B, the longitudinal axis of the impeller blades at an angle with the shaft longitudinal axis; FIG. 7C, the longitudinal axis of the impeller blades is curved downward in a forward direction.

DETAILED DESCRIPTION OF THE PREFERRED EMBODIMENTS

A description of the preferred embodiments of the present invention will now be presented with reference to FIGS. 1-9.

Figure 1:
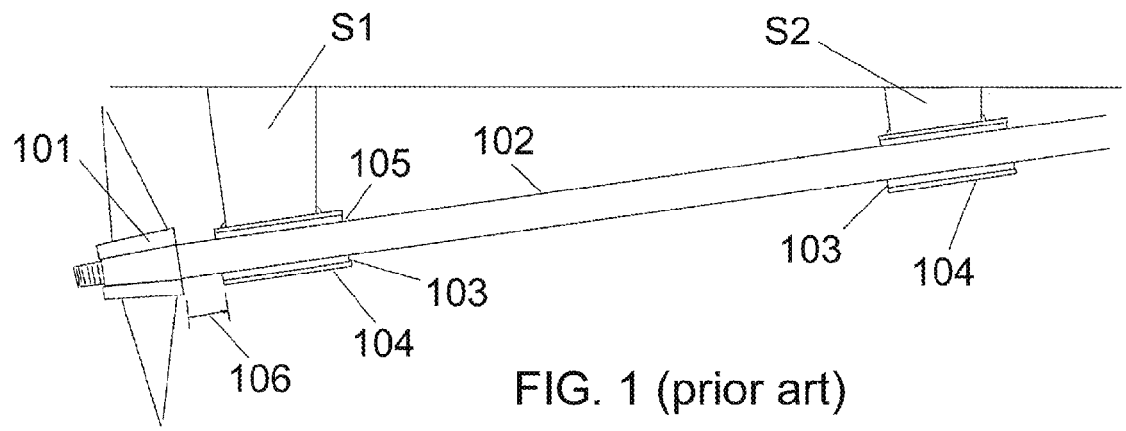
FIG. 1 (prior art) is a cross-sectional side view a propulsion setup for inboard engine vessel.
Figure 2:
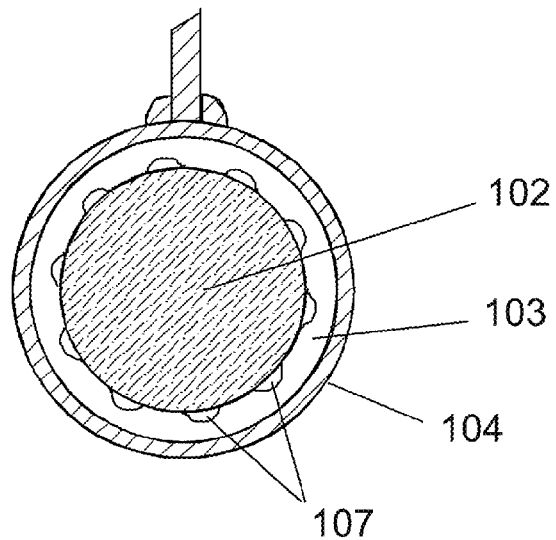
FIG. 2 (prior art) cross-sectional end view of a propeller shaft, cutlass bearing, bearing housing, and water channel grooves.

In FIGS. 1 and 2 are shown a typical marine vehicle arrangement of a propeller hub 101, drive shaft 102, cutlass bearings 103, bearing housing 104, water inlet 105, and bearing-to-propeller dimension 106. S1 and S2 are an aft strut and intermediate strut, respectively, which support the bearing housings 104. Vessels with relatively short shafts generally use only one bearing S1. Intermediate struts S2 and bearings 103 are typically used on vessels with longer shafts. FIG. 2 further includes an illustration of the water channel grooves 107 in the cutlass bearing 103.

Figure 3:
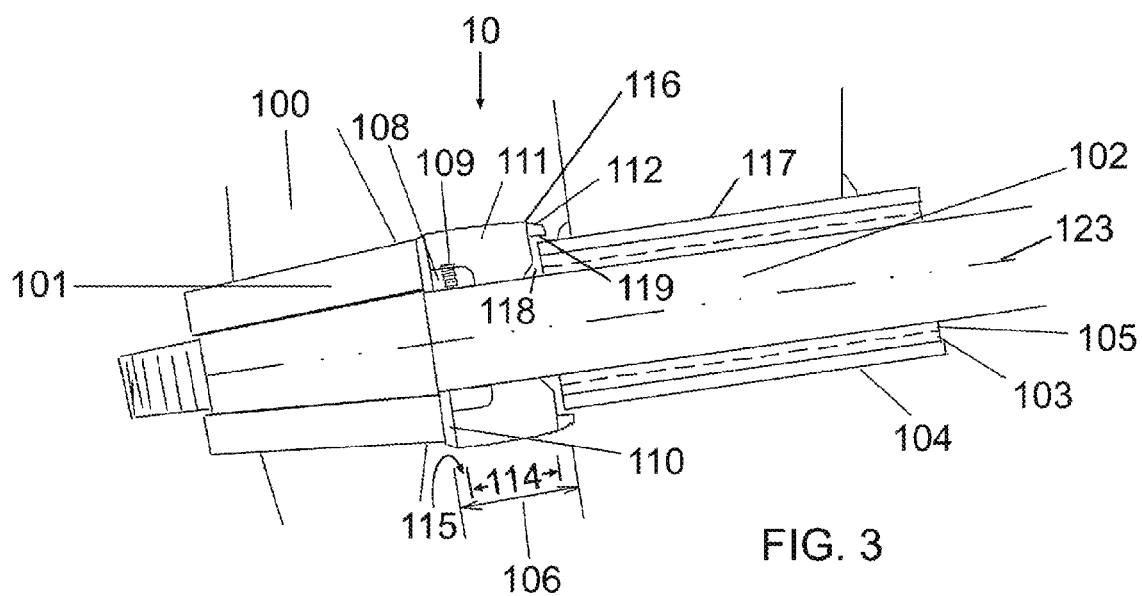
FIG. 3 is a cross-sectional side view of a device of the present invention mounted on a propeller shaft.

FIG. 3 shows a cross-sectional side view of a propulsion setup with an embodiment of a device 10 of the present invention mounted in the space 106 abaft the cutlass bearing 103 and before the propeller 100. For this type of application the device 10 is manufactured to fit the available space 106, with sufficient clearance to provide for some lateral and longitudinal movement of the shaft. A substantially annular collar 108 is dimensioned for placement over the propeller shaft 102 and extends approximately half the distance of the total length of the distance 106. Multiple setscrews 109 in the collar 108 can be used to lock the device to the shaft 102. An annular back-plate 110 is welded to the collar 108 and fits flush against the propeller hub 101 in this embodiment. As an alternative affixing means of locking the device to the shaft 102, the device may be attached with multiple cap screws fastening the back-plate 110 to tapped holes in the propeller hub 101.

Multiple equally spaced impeller blades 111 are disposed radially around the device 10 and are welded to the collar 108 and back-plate 110. A length 114 of the impeller blades 111 plus a width 115 of the backplate 110 nearly spans the distance 106, leaving a gap 118 to allow for sufficient clearance between the impeller blades and bearing housing 104. Forward ends 116 of the impeller blades 111 are welded to an annular ring 112, which holds the forward ends 116 of the impeller blades 111 in place. The annular ring 112 extends a short distance 119 over an outside 117 of the bearing housing 104, thereby covering the gap 118 between the impeller blades 111 and bearing housing 104.

Figure 4:
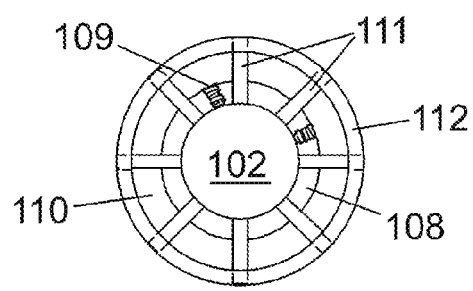
FIG. 4 is an end view of the device of FIG. 3, illustrating a plurality of impeller blades equally spaced around the periphery.

FIG. 4 shows an end view of the device 10, with a plurality of impeller blades 111 substantially equally spaced around the shaft 102.

Figure 5A:
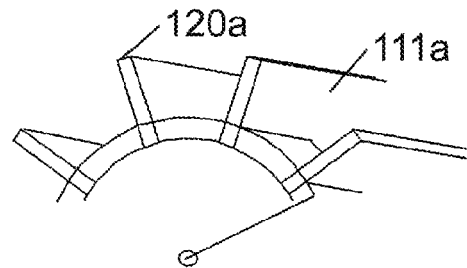
FIGS. 5A-5D depict various impeller blade embodiments.
Figure 5B:
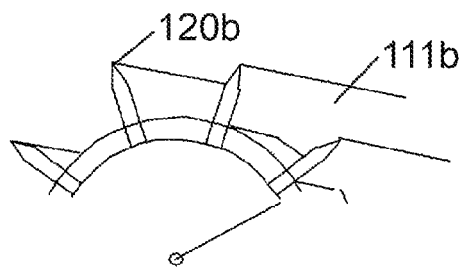
Figure 5C:
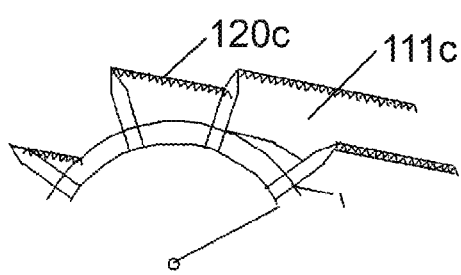
Figure 5D:
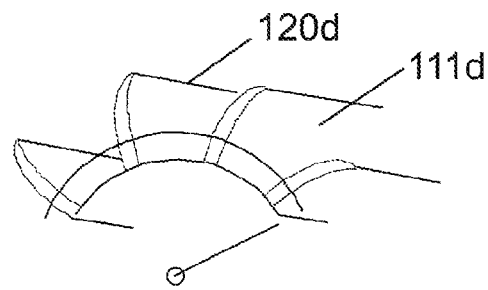

FIGS. 5A-5D depict various impeller blade cross-section embodiments that have been contemplated for use in the invention. although these are not intended as limitations. A simple design 111a (FIG. 5A) comprises a flat plate blade of rectangular cross section with square outside edge 120a. FIG. 5B illustrates a flat blade design 111b with pointed outside edges 120b. FIG. 5C illustrates a flat blade design 111c with serrated outside edges 120c. FIG. 5D illustrates a curved blade 111d with a pointed outside edge 120d.

Figure 6A:
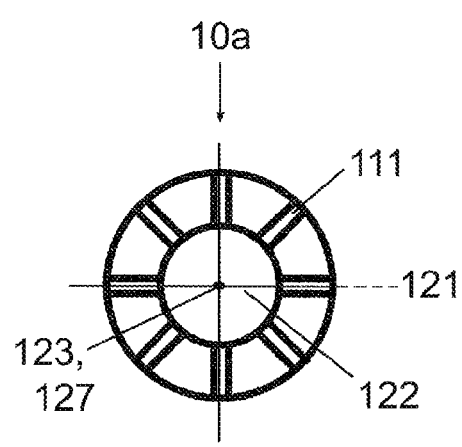
FIGS. 6A,6B are end views of two impeller blade placement embodiments.
Figure 6B:
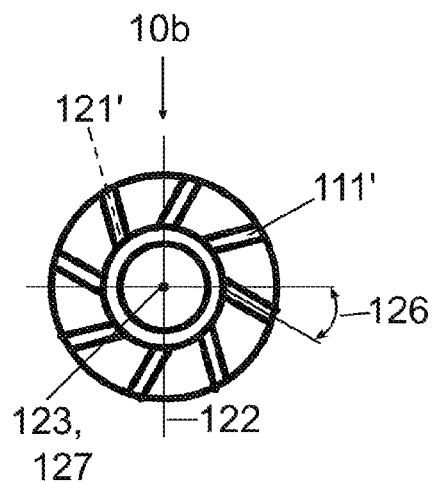

FIGS. 6A,6B depict end views of two impeller blade placement embodiments 10a,10b, with the embodiment 10a of FIG. 6A having a blade 111 placed with a radial axis 121 collinear with a radius 122 extending from the shaft axis 123. In the embodiment 10b of FIG. 6B, an impeller blade 111' is placed with its radial axis 121' at an angle 126 with respect to the radius 122 extending from the shaft axis 123. The angle 126 can be in a range of 0 to 45 degrees, for example.

Figure 7A:
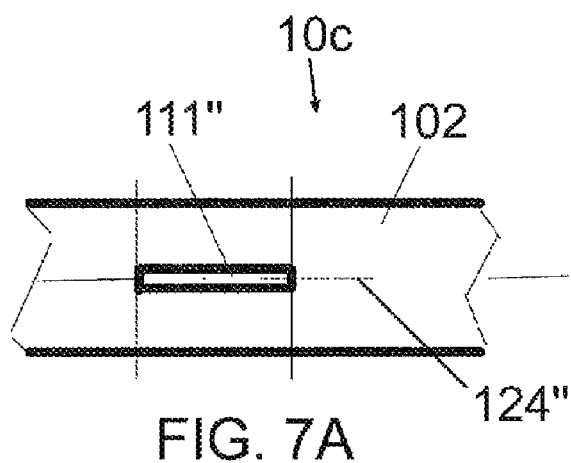
FIGS. 7A,7B,7C illustrate three embodiments varying in longitudinal placement of the impeller blades.
Figure 7B:
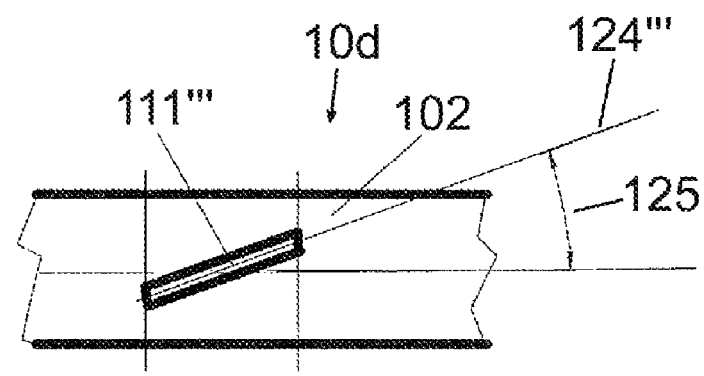
Figure 7C:
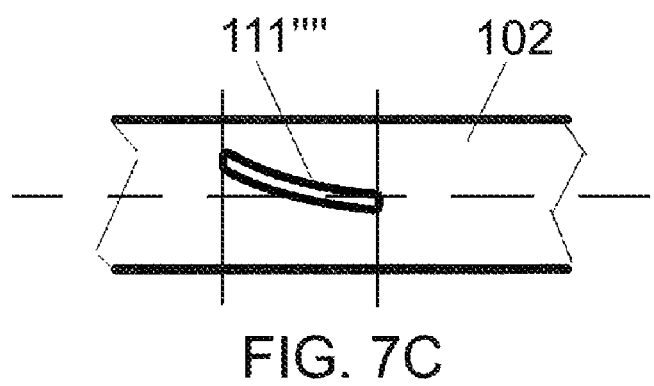

FIGS. 7A-7C depict embodiments 10c,10d in longitudinal placements of the impeller blades 111",111'". The longitudinal axis 124" of the impeller blades 111" can be parallel to the collar axis 127, which in use is collinear with the shaft axis 123, as depicted in FIG. 7A, or the longitudinal axis 124'" can be placed at an angle 125 with respect to the collar axis 127, as depicted in FIG. 7B. Alternatively, the impeller blades 111"" can be downwardly curved in a forward direction with respect to the shaft axis 123, as depicted in FIG. 7C. The longitudinal blade angle 125 can range between 0 and 30 degrees, for example.

All the variations in blade cross section and placement depicted in FIGS. 5A-7C are capable of successfully achieving the objects of this invention. It is evident that the options in blade cross-section design and placement will only serve to enhance the performance of the invention and provide more options for particular applications. For example, it would seem reasonable that blades and annular rings with sharp and/or serrated edges will cut through fouling better, while curved blade sections will be better at creating pumping action. It is also evident that placing the blades at an angle to the longitudinal axis of the shaft, or having helical blades, may be used to create positive thrust with the device. The performance benefits of a certain blade design and placement scheme for a device can be weighed against the cost of its manufacture, durability, and maintenance.

Also contemplated in the design of the device are various shaped fairings that may be fixed to the existing bearing housing forward of the device. The benefits of such fairings include that they (1) provide a better hydrodynamic profile, and lower resistance of the device, (2) improve the pumping ability of the invented device by serving as a volute of a pump, (3) help prevent fouling materials from jamming the device.

Figure 8:
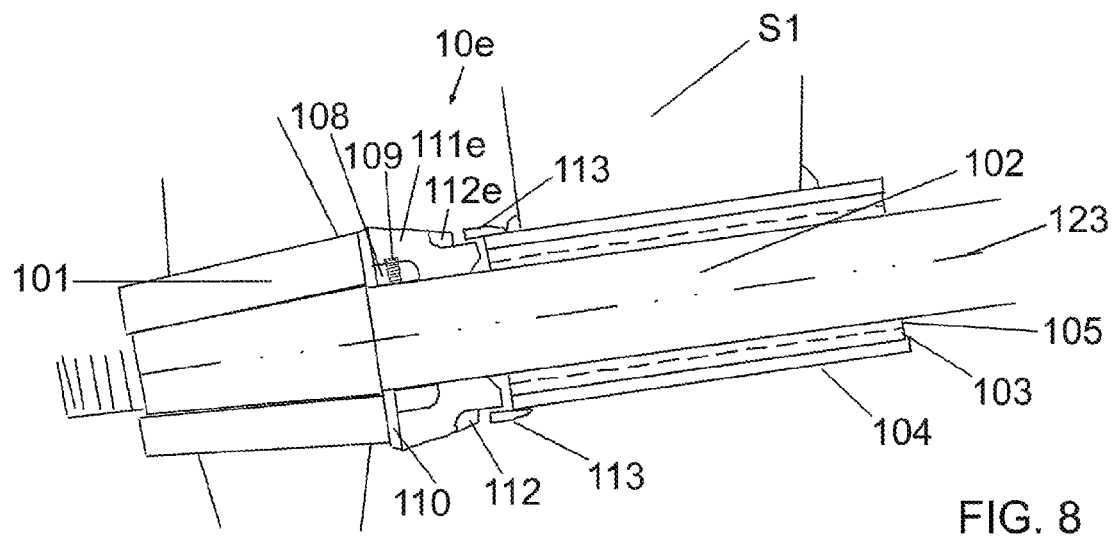
FIG. 8 illustrates another embodiment of the invention that includes a fairing and a different impeller profile.

FIG. 8 shows another embodiment 10e of the invention that includes a fairing and alternative impeller profile. The annular fairing ring 113 can be mounted to the bearing housing 104 with tapped screws. Forward annular ring 112e and impeller blades 111e are designed to fit the sleeker profile, as compared with the embodiment 10 of FIG. 3, with the annular ring 112e in this embodiment 10e not extending over the bearing housing 104.

Figure 9:
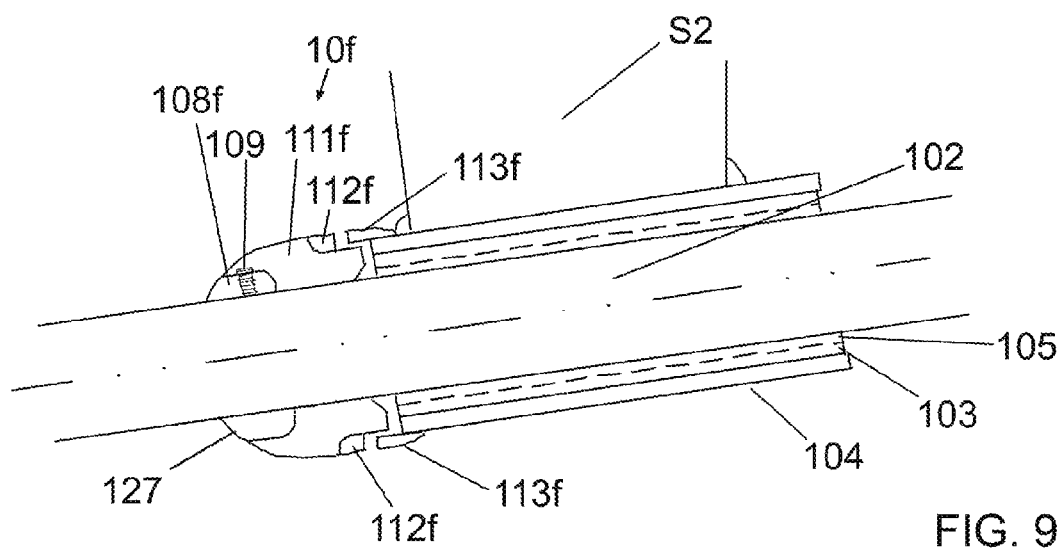
FIG. 9 illustrates an embodiment designed for intermediate shaft bearings.

For intermediate bearings S2, where there is no propeller behind the bearing S2, the device 10f can have a different profile. FIG. 9 depicts one embodiment 10f of the invention designed for intermediate shaft bearings S2. A redesigned impeller profile 111f and the absence of a back plate present a more hydrodynamic profile, while other elements such as 112f, 113f, and 109 remain similar to the embodiments shown above. The collar 108f can have a rounded rear edge 127 for improved hydrodynamic performance.

It will be understood by one of skill in the art that the embodiment 10f FIG. 9 could also be used in concert with any type of shaft-borne bearing, for example, in a pump, for enhancing the lubrication thereof. The structure for this type of device would be substantially the same as that depicted in FIG. 9.

Design Theory

The cross-sectional area of the water flow channels in traditional cutlass bearings is relatively small. For example, the height of the water channels in cutlass bearings measured from the shaft surface is less than one-half inch for shafts up to 4 in. thick. Therefore, when propeller shafts become fouled with lines, ropes, or other material behind the cutlass bearing, the water flow through the bearing is quickly blocked. Without a steady flow of water, the bearing and shaft surfaces are starved for lubrication, causing overheating and premature wear in the bearing and shaft surfaces.

Conventional cutlass bearings depend only on the hydrodynamic force of the water flowing past them to provide water flow through the bearing. Many cutlass bearing housings have an inlet scoop designed on the forward end to promote positive water pressure on the forward side of the bearing. The amount of pressure developed at the forward end of the bearing is proportional to the speed of the water moving past the bearing. A slow-moving vessel, or one that is not moving, will therefore have much less water flowing through the bearing that would a vessel moving at high speed.

With the use of the instant invention several key improvements are realized.

1. The aft end of the bearing is shielded from external fouling by the placement of the impeller blades, which extend radially from the surface of the propeller shaft in the device. Restriction of water flow is therefore less likely and also direct wear damage to the bearing is less likely from fouling materials.

2. The use of the device prevents bearing damage from water starvation even with fouling around the shaft and/or the device. This because the effective discharge area for water coming through the bearing and out of the invented device is about 100 times greater than it is without the device.

3. The shaft-mounted impeller blades of the invented device cause centrifugal pumping action, which greatly increases the hydraulic force acting on the water that is fed through the cutlass bearing. That centrifugal force creates suction on the aft side of the bearing. The amount of hydraulic pressure imparted by the centrifugal action of the impeller blades is strictly dependent on shaft speed and not vessel speed. Therefore, the benefits of the invention for slower-moving vessels is even more significant.

4. The sharp edges of rotating impeller blades make a much more hostile environment for fouling material that winds around the shaft than are the relatively smooth surfaces of the shaft and bearing housings found in traditional propulsion systems without the present device. Therefore, fouling is ripped apart by the rotating blades and does not remain in place as long when the device of the present invention is mounted to the propulsion gear.

Finally, another potential advantage of the device is that the design of cutlass bearings can be improved because engineer-designers will have a new option of having forced water flow available instead of depending only on passive water flow as with conventional bearing designs.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

What is claimed is:

1. A device for improving a performance of a propeller-driven propulsion apparatus comprising:
    an annular collar affixable for rotation with and dimensioned for positioning about a shaft of a propeller in a longitudinal space between a propeller hub and a cutlass bearing;
    a plurality of impeller blades affixed to and extending radially out from the collar in spaced-apart relation, each impeller blade having a length sufficient to nearly span the longitudinal space between the propeller hub and the cutlass bearing, leaving a gap between forward ends of the blades and the cutlass bearing;
    an annular ring affixed in spanning relation to the forward ends of the impeller blades; and
    a bridging element extending from one of the annular ring and the cutlass bearing positioned to longitudinally bridge the gap between the blades forward ends and the cutlass bearing, thereby substantially enclosing the gap.

2. The device recited in claim 1, wherein the collar has a longitudinal extent approximately one-half the longitudinal space between the propeller hub and the cutlass bearing.

3. The device recited in claim 1, further comprising a plurality of set screws insertable through radial apertures in the collar for affixing the collar to the propeller shaft.

4. The device recited in claim 1, further comprising an annular backplate affixed to a rear face of the collar and positionable substantially flush against the propeller hub, the backplate having a radial extent approximately equal to a radial extent of the impeller blades.

5. The device recited in claim 1, further comprising an annular backplate affixable to and positionable substantially flush against the propeller hub, the backplate having a radial extent approximately equal to a radial extent of the impeller blades.

6. The device recited in claim 1, wherein the bridging element comprises an annular protrusion extending forward from the annular ring to a forward end forward of a rear end of the cutlass bearing.

7. The device recited in claim 1, wherein the bridging element comprises an annular fairing ring affixable about the cutlass bearing and having a rear end rear of the blades forward ends.

8. The device recited in claim 1, wherein each of the impeller blades has a shape selected from a group consisting of:
- a substantially rectilinear shape having a squared outside edge;
- a substantially rectilinear shape having a pointed outside edge;
- a substantially rectilinear shape having a serrated outside edge; and
- an arcuate shape curving about a radial axis having a pointed outside edge.

9. The device recited in claim 1, wherein the impeller blades have a longitudinal axis selected from one of substantially parallel with a longitudinal axis of the collar, at an angle with the collar longitudinal axis, and curving downwardly forward relative to the collar longitudinal axis.

10. A method for improving a performance of a propeller-driven propulsion apparatus comprising:
- affixing an annular collar for rotation with a shaft of a propeller in a longitudinal space between a propeller hub and a cutlass bearing, the collar having affixed thereto a plurality of impeller blades extending radially out from the collar in spaced-apart relation, each impeller blade having a length sufficient to nearly span the longitudinal space between the propeller hub and the cutlass bearing, leaving a gap between forward ends of the blades and the cutlass bearing, forward ends of the impeller blades having affixed thereto in spanning relation an annular ring; and
- substantially enclosing the gap between the blades forward ends and the cutlass bearing, by positioning a bridging element to longitudinally extend from one of the annular ring and the cutlass bearing.

11. The method recited in claim 10, wherein the collar has a longitudinal extent approximately one-half the longitudinal space between the propeller hub and the cutlass bearing.

12. The method recited in claim 11, further comprising affixing the collar to the propeller shaft using a plurality of set screws insertable through radial apertures in the collar.

13. The method recited in claim 10, further comprising affixing an annular backplate to a rear face of the collar positioned substantially flush against the propeller hub, the backplate having a radial extent approximately equal to a radial extent of the impeller blades.

14. The method recited in claim 10, further comprising affixing an annular backplate to the propeller hub in substantially flush relation, the backplate having a radial extent approximately equal to a radial extent of the impeller blades.

15. The method recited in claim 10, wherein the bridging element comprises an annular protrusion extending forward from the annular ring to a forward end forward of a rear end of the cutlass bearing.

16. The method recited in claim 10, wherein the bridging element comprises an annular fairing ring affixable about the cutlass bearing and having a rear end rear of the blades forward ends.

17. The method recited in claim 10, wherein each of the impeller blades has a shape selected from a group consisting of:
- a substantially rectilinear shape having a squared outside edge;
- a substantially rectilinear shape having a pointed outside edge;
- a substantially rectilinear shape having a serrated outside edge; and
- an arcuate shape curving about a radial axis having a pointed outside edge.

18. The method recited in claim 10, wherein the impeller blades have a longitudinal axis selected from one of substantially parallel with a longitudinal axis of the collar, at an angle with the collar longitudinal axis, and curving downwardly forward relative to the collar longitudinal axis.

19. A device for improving a performance of a bearing through which liquid is intended to flow comprising:
- an annular collar affixable for rotation with and dimensioned for positioning about a shaft behind a bearing;
- a plurality of impeller blades affixed to and extending radially out from the collar in spaced-apart relation, each impeller blade extending forward toward a rear end of the bearing, leaving a gap between forward ends of the blades and the bearing;
- an annular ring affixed in spanning relation to the forward ends of the impeller blades; and
- a bridging element extending from one of the annular ring and the bearing positioned to longitudinally bridge the gap between the blades forward ends and the bearing, thereby substantially enclosing the gap.

20. The device recited in claim 19, wherein a rear face of the collar is rounded toward a rear end for decreasing hydrodynamic resistance.

21. The device recited in claim 19, wherein the bridging element comprises an annular fairing ring affixable about the bearing and having a rear end rear of the blades forward ends.

* * * * *